United States Patent
Geipel et al.

(10) Patent No.: US 12,243,287 B2
(45) Date of Patent: Mar. 4, 2025

(54) METHOD FOR CONFIGURING AN IMAGE EVALUATION DEVICE AND ALSO IMAGE EVALUATION METHOD AND IMAGE EVALUATION DEVICE

(71) Applicant: Siemens Healthcare Diagnostics Inc., Tarrytown, NY (US)

(72) Inventors: Markus Michael Geipel, Munich (DE); Florian Büttner, Munich (DE); Christoph Tietz, Ottobrunn (DE); Gaby Marquardt, Hausen (DE); Daniela Seidel, Baiersdorf (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 618 days.

(21) Appl. No.: 17/280,863

(22) PCT Filed: Sep. 16, 2019

(86) PCT No.: PCT/IB2019/057772
§ 371 (c)(1),
(2) Date: Mar. 26, 2021

(87) PCT Pub. No.: WO2020/065436
PCT Pub. Date: Apr. 2, 2020

(65) Prior Publication Data
US 2022/0012531 A1    Jan. 13, 2022

(30) Foreign Application Priority Data
Sep. 28, 2018 (EP) .................................. 18197650

(51) Int. Cl.
*G06F 18/214* (2023.01)
*G06F 18/22* (2023.01)
(Continued)

(52) U.S. Cl.
CPC .......... *G06V 10/764* (2022.01); *G06F 18/214* (2023.01); *G06F 18/22* (2023.01);
(Continued)

(58) Field of Classification Search
CPC .... G06F 18/214; G06F 18/22; G06F 18/2415; G06V 10/764; G06V 10/82; G06V 20/698; G06V 2201/03; G06N 3/045
See application file for complete search history.

(56) References Cited

U.S. PATENT DOCUMENTS

2005/0185835 A1    8/2005  Matsugu et al.
2016/0086078 A1    3/2016  Ji et al.
(Continued)

FOREIGN PATENT DOCUMENTS

CA    2948499 A1 *  5/2018  ........ G06K 9/00147
CN    101084511 A    12/2007
(Continued)

OTHER PUBLICATIONS

Cerri, R. et al.: "Hierarchical multi-label classification using local neural networks"; Journal of Computer and System Sciences; Academic Press, Inc., London, GB; Bd. 80; Nr. 1; Mar. 22, 2013; pp. 39-56; XP028729154; (2013).
(Continued)

*Primary Examiner* — Marcos L Torres
(74) *Attorney, Agent, or Firm* — Dugan & Dugan, PC

(57) ABSTRACT

An image analysis device (BA) is configured to recognize imaged objects. A plurality of training images (TPIC) assigned to an object type (OT) and an object sub-type (OST) are fed into a first neural network module (CNN) to detect image features. Training output data sets (FEA) of the first neural network module are fed into a second neural network module (MLP) to detect object types using the detected image features. For each object type: training
(Continued)

images assigned to the object type (OT1, OT2) are fed into the trained first neural network module, the first neural network module training output data set (FEA1, FEA2) generated for the respective training image is assigned to the object sub-type (OST) of the respective training image, and by means of the aforementioned sub-type assignments, a sub-type detection module (BMLP1, BMLP2) is configured to detect object sub-types.

12 Claims, 2 Drawing Sheets

(51) Int. Cl.
  *G06F 18/2415* (2023.01)
  *G06N 3/045* (2023.01)
  *G06V 10/764* (2022.01)
  *G06V 10/82* (2022.01)
  *G06V 20/69* (2022.01)
(52) U.S. Cl.
  CPC ......... *G06F 18/2415* (2023.01); *G06N 3/045* (2023.01); *G06V 10/82* (2022.01); *G06V 20/698* (2022.01); *G06V 2201/03* (2022.01)

(56) References Cited

U.S. PATENT DOCUMENTS

| | | | |
|---|---|---|---|
| 2017/0169567 | A1 | 6/2017 | Chefd'Hotel et al. |
| 2017/0262996 | A1* | 9/2017 | Jain ..................... G06V 10/462 |
| 2018/0263568 | A1 | 9/2018 | Yi et al. |

FOREIGN PATENT DOCUMENTS

| | | |
|---|---|---|
| CN | 105447498 A | 3/2016 |
| CN | 105849274 A | 8/2016 |
| CN | 108564123 A | 9/2018 |
| WO | WO2018001689 A1 | 1/2018 |
| WO | 2018052586 A1 | 3/2018 |
| WO | WO2018052587 A1 | 3/2018 |
| WO | WO2018140014 A1 | 8/2018 |

OTHER PUBLICATIONS

Choi, H. et al: "Exploiting hierarchical structure of classes in object classification using deep convolutional neural networks"; Thesis, Korea Advanced Institute of Science and Technology, Korea; Jan. 2015; pp. 1-40; XP009520962; (2015).

Zhicheng, Y. et al.: "HD-CNN: Hierarchical Deep Convolutional Neural Networks for Large Scale Visual Recognition"; 2015 IEEE International Conference on Computer Vision (ICCV) DOI 10.1109/ICCV.2015.314; IEEE; Dec. 7, 2015; pp. 2740-2748; XP032866619; (2015).

Ching, T.et al.: "Opportunities and obstacles for deep learning in biology and medicine", J.R.Soc. Interface, vol. 15, No. 20170387, 181, pp. 1-47, XP002789257, ISSN: 1742-5689, DOI:10.1098/rsif.2017.0387; p. 20; 2018.

Hatipoglu, N. et al.: "Cell segmentation in histopathological images with deep learning algorithms by utilizing spatial relationships", Medical and Biological Engineering and Computing., vol. 55, No. 10, pp. 1829-1848, XP055523535, DE; ISSN: 0140-0118, DOI: 10.1007/s11517-017-1630-1; p. 1829, col. 2; 2017.

Li, H. et al.: "Cell dynamic morphology classification using deep convolutional neural networks", Citometry Part A, vol. 93A, pp. 628-638, XP002789256, DOI: 10.1002/cyto.a.23490; Abstract; 2018.

Li, Z. et al.: "Large-scale Exploration of Neuronal Morphologies Using Deep Learning and Augmented Reality", Neuroinformatics, Humana Press Inc, Boston, vol. 16, No. 3, pp. 339-349, XP036568563, ISSN: 1539-2791, DOI:10.1007/S12021-018-9361-5; found on Feb. 12, 2018; p. 340, col. 2; 2018.

Rouhi, R. et al.: "Benign and malignant breast tumors classification based on region growing and CNN segmentation", Expert Systems with Applications, Oxford, GB, vol. 42, No. 3, pp. 990-1002, XP029095199, ISSN: 0957-4174, DOI: 10.1016/J.ESWA.2014.09.020; Section 1; 2014.

Xie, Y. et al.: "Beyond Classification: Structured Regression for Robust Cell Detection Using Convolutional Neural Network", Serious Games, Springer International Publishing, Switzerland 032682, XP055561110, ISSN: 0302-9743; ISBN: 978-3-642-37803-4; vol. 9351, pp. 358-365, DOI: 10.1007/978-3-319-24574-4_43, Section 2; 2015.

European Search Report of related European Application No. 18197650.7 dated Mar. 8, 2019.

International Search Report and Written Opinion of related International Application No. PCT/IB2019/057772 dated Dec. 10, 2019.

Roy, D. et al: "Tree-CNN: A Deep Convolutional Neural Network for Lifelong Learning", Feb. 15, 2018 XP080856810, p. 1-10, arXiv:1802.05800v1 (2018).

Rouhi, R., et al.; "Benign and malignant breast tumors classification based on region growing and CNN segmentation". Sep. 26, 2014; Expert Systems with Applications (2014), http://dx.doi.org/10.1016/j.eswa.2014.09.020.

* cited by examiner

METHOD FOR CONFIGURING AN IMAGE EVALUATION DEVICE AND ALSO IMAGE EVALUATION METHOD AND IMAGE EVALUATION DEVICE

CROSS REFERENCE TO RELATED APPLICATIONS

This is a 371 of PCT/IB2019/057772, filed Sep. 16, 2019, which claims priority to European Patent Application No. EP 18197650.7, filed Sep. 28, 2018, both of which are hereby incorporated by reference herein in their entireties for all purposes.

FIELD

The invention is directed to methods and devices for learning-based recognition of imaged objects.

BACKGROUND

For the automatic evaluation of image recordings, for example, in medical diagnosis, when monitoring technical or non-technical systems and/or in the context of the visual sensor apparatus of autonomous systems, machine learning methods are increasingly being used. By means of these methods, a learning-based image evaluation device can be trained to automatically recognize objects represented on images or assign them to an object type.

In this regard, by way of example, an image evaluation device of a medical diagnosis apparatus can be trained to specifically recognize cell or tissue types on micrographs or assign them respectively to a cell or tissue type. In particular, the image evaluation device can be trained to assign image recordings of biological cells, e.g., of blood cells, respectively, to a cell type as object type and a developmental stage of this cell type as object sub-type.

A great multiplicity of predefined images, to which an object type and optionally an object sub-type have already been assigned, are often used for such training. By means of such training images, a learning-based image evaluation device can be trained to reproduce the predefined object types and optionally object sub-types as well as possible, that is to say, for example, to recognize the cell types and the developmental stages thereof with the least possible deviation with respect to the predefined object types and object sub-types. A multiplicity of known learning methods, in particular supervised learning methods, are available for carrying out such training.

In practice, however, it often happens that some of the object types to be recognized occur considerably less frequently than other object types. In this regard, some biological cell types, in particular pathological cell types, make up only a proportion of less than 0.005% of all cell types. Accordingly, the number of training images available for rare object types is generally considerably less than the number available for more common object types. However, if only a small number of training images are available for training, the training success and thus the recognition accuracy can deteriorate considerably in conventional training methods. Moreover, sub-types of rare object types can often be recognized or differentiated only with difficulty.

Precisely in the medical field, however, it is often important to identify even rare pathological patterns and developmental stages as correctly as possible. It is known, for better classification of rare object types, for specific image features to be determined individually by experts and for the training to be adapted thereto. Alternatively or additionally, the training can be continued until a sufficient number of training images of rare object types have been evaluated. As a result of the above procedures, however, a required training outlay, particularly when rare object types are involved, can rise considerably.

SUMMARY OF THE INVENTION

It is an object of the present invention to specify a method for configuring an image evaluation device, an image evaluation method and also an image evaluation device which allow more efficient training.

This object is achieved by means of a configuration method having the features of patent claim 1 and image evaluation method having the features of patent claim 9.

For configuring an image evaluation device for determining an object type and object sub-type of an imaged object, a multiplicity of training images respectively assigned to an object type and an object sub-type are fed into a first neural network module for recognizing image features. Biological cells, in particular, can function as objects and their respective cell type can be determined as object type and their respective developmental stage or cell status can be determined as object sub-type. Furthermore, training output data sets of the first neural network module are fed into a second neural network module for recognizing object types on the basis of image features. According to the invention, the first and second neural network modules are jointly trained to the effect that training output data sets of the second neural network module at least approximately reproduce the object types assigned to the training images. Furthermore, for a respective object type:

training images assigned to this object type are fed into the trained first neural network module, the latter's training output data set generated for a respective training image is assigned to the object sub-type of the respective training image, and these sub-type assignments are used as a basis to configure a sub-type recognition module for recognizing object sub-types on the basis of image features for the image evaluation device.

Dividing the configuration into data-driven training and an object-type-specific configuration makes it possible to mitigate many disadvantages of conventional training methods caused by a lack of object-type-specific training data.

Consequently, the configuration method according to the invention often proves to be particularly efficient for determining object sub-types of rare object types and generally where there is a highly uneven distribution of object frequencies.

An image evaluation method according to the invention for determining an object type and object sub-type of an imaged object can be implemented by means of the first and second neural network modules trained as above and also a sub-type recognition module configured as above. In this case, an image to be evaluated is fed into the trained first neural network module and a resulting output data set of the trained first neural network module is fed into the trained second neural network module. An object type is then derived from a resulting output data set of the trained second neural network module. Furthermore, a sub-type recognition module configured specifically for the derived object type is selected and determines an object sub-type correlating with the output data set of the trained first neural network module. Finally, the derived object type and also the determined object sub-type are output.

On account of a division in the image evaluation method according to the invention corresponding to the configuration method according to the invention, this image evaluation method generally allows a more reliable determination of object sub-types of rare object types, particularly when there is a highly uneven distribution of object frequencies.

A corresponding image evaluation device, a computer program product, and also a computer-readable storage medium are provided for carrying out the configuration method according to the invention and/or the image evaluation method according to the invention.

The configuration method according to the invention, the image evaluation method according to the invention, the image evaluation device according to the invention, and also the computer program product according to the invention can be carried out or implemented, for example, by means of one or more processors, application-specific integrated circuits (ASIC), digital signal processors (DSP), and/or so-called "field programmable gate arrays" (FPGA).

Advantageous embodiments and developments of the invention are specified in the dependent claims.

Preferably, the sub-type assignments can be used as a basis to derive correlation parameters for a correlation between image features and object sub-types. The sub-type recognition module can be configured on the basis of the correlation parameters. Such correlations or correlation parameters make it possible, by means of statistical standard methods in relation to given image features not yet classified, to determine an object sub-type that correlates the best or sufficiently well therewith.

In accordance with one advantageous embodiment of the invention, a probabilistic classifier, in particular a so-called Bayes classifier, can be used as sub-type recognition module. In this case, estimated and/or conditional probabilities and uncertainties can be used as correlation parameters. A probabilistic classifier, in particular a so-called Bayes classifier, can assign given image features or other features to that class to which they belong with the highest probability.

Advantageously, the sub-type recognition module can have a linkage structure corresponding to the second neural network module. If a multilayer perceptron is used as second neural network module, a corresponding sub-type recognition module in this sense can be embodied as a multilayer Bayesian perceptron. In the case of corresponding linkage structures, learning parameters and hyperparameters of the second neural network module can advantageously be reused in the configuration of the sub-type recognition module.

Furthermore, on the assumption that object sub-types to be recognized for an object type form an ordered sequence specified by predefined sequence information, the sub-type recognition module can be configured on the basis of the sequence information. Such a sequence can be given, for example, by the chronological sequence of developmental stages of cell types.

During the configuration of the sub-type recognition module, preferably, a so-called ordinal regression can be carried out on the basis of such sequence information. In particular, an activation function of a neural end layer of the sub-type recognition module can be adapted and/or a so-called probit model can be used. Furthermore, activation thresholds of activation functions can be learned.

In accordance with a further embodiment of the invention, an a priori distribution of configuration parameters of a probabilistic classifier can be determined on the basis of learning parameters of the trained second neural network module. In this case, in particular, parameters of the second neural network module that are set or optimized by the training are designated as learning parameters. In particular, Markov chain Monte Carlo methods and variation-based or other Bayesian derivation methods can be used for deriving configuration parameters of the probabilistic classifier. In this way, information obtained by the training regarding learning parameters and the value distribution thereof can advantageously be reused for the configuration of the sub-type recognition module.

Furthermore, configuration parameters of the sub-type recognition module can be set depending on training parameters of the first and/or second neural network module. The training parameters can be hyperparameters and other parameters that control the training and/or are obtained by the training.

Furthermore, in the configuration method according to the invention and also in the image evaluation method according to the invention, the first neural network module, the second neural network module, and/or the sub-type recognition module can comprise an artificial neural network, a recurrent neural network, a convolutional neural network, a multilayer perceptron, a Bayesian neural network, an autoencoder, a deep learning architecture, a support vector machine, a data-driven. trainable regression model, a k-nearest neighbor classifier, a physical model, and/or a decision tree.

BRIEF DESCRIPTION OF THE DRAWINGS

An exemplary embodiment of the invention is explained in Greater detail below with reference to the drawing. Here in each case is a schematic illustration.

DETAILED DESCRIPTION OF THE INVENTION

Figure 1:
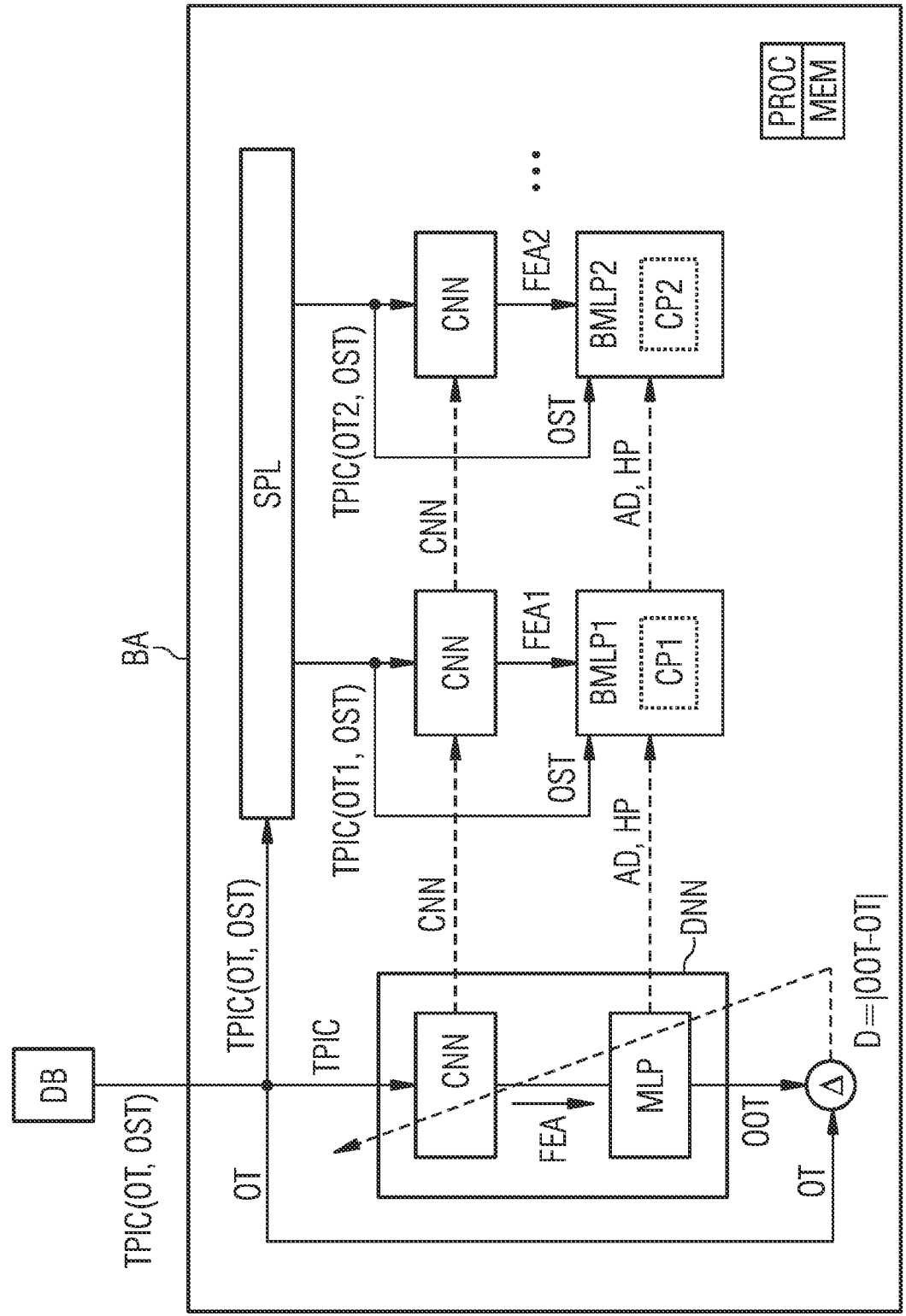
FIG. 1 illustrates a configuration of an image evaluation device according to the invention.

FIG. 1 illustrates a configuration of an image evaluation device BA according to the invention for recognizing objects imaged on images to be evaluated and, in particular, for determining an object type and also an object sub-type of a respectively imaged object.

The image evaluation device BA has one or more processers PROC for carrying out method steps of the image evaluation device BA and one or more memories MEM coupled to the processor PROC for storing the data to be processed by the image evaluation device BA.

In the present exemplary embodiment, a medical image evaluation device BA for evaluating microscopic image recordings of biological cells as objects to be recognized is described as an exemplary application of the invention. On the basis of one or more images of a cell, the cell type thereof is intended to be determined as an object type and a developmental stage or cell status of the cell type is intended to be determined as an object sub-type. For this purpose, the image evaluation device BA is configured by means of machine learning methods, as described below.

In the context of this configuration, a great multiplicity of previously classified training images TPIC, here microscopic image recordings of biological cells, are read in from a database DB by the image evaluation device BA. Classified means here that the training images TPIC have previously been assigned, for example, by experts, respectively to an object type OT, that is to say a cell type, and an object sub-type OST, that is to say a developmental stage or cell status. The respective object type OT and object sub-type OST can each be specified in the form of a type and sub-type identifier, respectively, and be read in by the image evaluation device BA from the database DB in a manner assigned to the relevant training image TPIC.

The training images TPIC read in are fed into a first neural network module CNN of the image evaluation device BA. The training images TPIC here are represented in each case by an image data set. The first neural network module CNN preferably comprises convolutional neural layers that form a deep convolutional neural network. Such a convolutional neural network is particularly suitable for efficiently recognizing image features within images fed in. Such image features can specify in particular—contained in the images—edges, corners, areas, or other, in particular, local geometric properties or relationships between image elements.

The first neural network module CNN is intended to be trained to extract image features of the images fed in that are particularly suitable for the object type recognition, or to generate them as output data. In this case, the image features of an image respectively fed in are represented by the output data set of the first neural network module CNN that respectively results therefrom. The output data sets of the first neural network module can thus be regarded as image data reduced to image features that are essential for the object type recognition. Such image features are often also referred to as features.

For the purpose of this training, training output data sets FEA generated from the training images TPIC by the first neural network module CNN are fed into a second neural network module MLP of the image evaluation device BA. In this case, a respective training output data set FEA results in each case from the processing of a respective training image TPIC.

The second neural network module MLP preferably comprises a multilayer perceptron (MLP). Such a perceptron MLP is particularly suitable for classification tasks, her for the classification of objects on the basis of image features.

The first and second neural network modules CNN and MLP together form a deep neural network DNN. The neural networks CNN and MLP can thus in particular also be regarded as subnetworks of the superordinate deep neural network DNN.

According to the invention, the second neural network module MLP is intended to be trained to recognize predefined object types OT on the basis of suitable image features.

In order to achieve the above training objectives of both the first neural network module CNN and the second neural network module MLP, both network modules CNN and MLP are trained jointly. The endeavor here is to ensure that training output data sets OOT generated by the second neural network module MLP from the training output data sets FEA fed in reproduce as accurately as possible the object types OT previously assigned to the training images TPIC fed in. A respective training output data set OOT of the second neural network module MLP results here in each case from the processing of a respective training image TPIC.

Training should generally be understood to mean optimizing a mapping of input data sets, here TPIC, of a parameterized system model, for example, of a neural network, onto the output data sets thereof, here onto the training output data sets OOT. This mapping is optimized according to predefined criteria, learned criteria, and/or criteria to be learned, during a training phase. In classification models, for example, a classification error, an analysis error, and/or a prediction error can be used as criteria. In the present case, the joint training of the network modules CNN and MLP endeavors to ensure that the training output data sets OOT correspond to the previously assigned object types OT as often as possible and/or as well as possible.

For this purpose, learning parameters of the network modules CNN and MLP are set by the training such that the training output data set OOT output by the second neural network module MLP as object type reproduces as well as possible the predefined object type OT of this training image TPIC. In this case, the learning parameters can comprise, for example, a networking structure of neurons of the network modules CNN and MLP and/or weights of connections between these neurons.

The optimization of the learning parameters that is striven for can be achieved, for example, by determining a deviation D between the training output data sets OOT and the predefined object types OT corresponding thereto in a suitable metric. In this case, the deviation D represents a classification error of the neural network DNN. If the training output data sets OOT and the predefined object types are represented by vectors, the deviation D can be determined, for example, as a multidimensional Euclidean or weighted distance of the vectors. The deviation D determined is fed back to the neural network DNN, that is to say to the joint training of the network modules CNN and MLP, as indicated by a dashed arrow in FIG. 1.

On the basis of the deviation D fed back, the neural network DNN is trained to minimize this deviation D, that is to say to reproduce the predefined object types OT as well as possible by means of the output object types OOT. For this purpose, the learning parameters can be varied by means of standard optimization methods until the deviation D is minimal or comes close to a minimum. By way of example, a gradient descent method can be used for minimization. A multiplicity of standard machine learning methods are available for carrying out the above optimization.

By way of the joint training described above, firstly the first network module CNN is trained to recognize or to generate those image features which are particularly well suited to an object type recognition, and secondly the second network model MLP is simultaneously trained to determine an associated object type on the basis of these image features.

This form of data-driven training of the network modules CNN and MLP can generally be applied very successfully to classification problems for which a great multiplicity of training images is available. As already mentioned in the introduction, however, it not infrequently happens that, in particular for recognizing object sub-types of rare object types, there are too few relevant training images available to train a deep neural network efficiently.

For this reason, according to the invention, for ascertaining object sub-types, instead of the second neural network module MLP, probabilistic classifiers are used as object-type-specific sub-type recognition modules. Such a probabilistic classifier can generally perform a classification even on the basis of a comparatively small amount of reference data. For example, the reference data can be used as a basis to determine a respective probability of a respective object sub-type being present and to output an object sub-type having a high or a highest probability as the classification result.

The sub-type classification of an image by a respective sub-type recognition module is performed on the basis of classification-relevant image features of this image, to generate which image features the trained first neural network module CNN is as it were reused. This reuse of the trained first neural network module CNN is indicated by dashed arrows in FIG. 1.

Advantageously, for each object type in each case a dedicated sub-type recognition module is specifically configured for recognizing object sub-types on the basis of image features.

For this purpose, the training images TPIC(OT, OST) are fed to a distribution module SPL of the image evaluation device BA and are distributed among object-type-specific configuration pipelines by the module depending on a respectively assigned object type, here OT1, OT2, . . . . Only two object types OT1 and OT2 are explicitly indicated in FIG. 1, for reasons of clarity.

In this regard, the training images TPIC(OT1, OST) assigned to the object type OT1 are fed to the trained first neural network module CNN, which generates therefrom image features FEA1 specific to the object type OT1 as training output data sets. The image features FEA1 of a respective training image TPIC(OT1, OST) are assigned to the object sub-type OST of this training image and with this assignment are communicated to a probabilistic classifier BMLP1 as a sub-type recognition module that is specific to the object type OT1. These object assignments are used as a basis to configure the probabilistic classifier BMLP1 for recognizing object sub-types of this object type OT1.

The probabilistic classifier BMLP1 is preferably embodied as a Bayesian neural network. The latter advantageously has a linkage structure between neurons that corresponds to the second neural network module MLP, or a corresponding architecture. In the present exemplary embodiment, the probabilistic classifier BMLP1 is thus implemented as a multilayer Bayesian perceptron.

The probabilistic classifier BMLP1 can be configured, for example, in such a way that the object-type-specific image features FEA1 of all or almost all training images TPIC (OT1, OST) of the object type OT1 are stored in a manner assigned to the respective object sub-type OST of the respective training image in the probabilistic classifier BMLP1. This requires a comparatively low storage outlay in the case of rare object types OT1. Furthermore, as a result— unlike in the case of conventional training of a neural network—all training information about an assignment of image features and object sub-types is substantially maintained.

By means of a probabilistic classifier BMLP1 configured in this way, for recognizing an object sub-type, for example, the image features of an image to be classified can be compared with all stored image features of this object type in a simple manner and an object sub-type having a smallest or a small deviation can be determined as the classification result. By contrast, expanding such a comparison across all training images, that is to say also across common object types, is generally not feasible with an acceptable outlay on account of the often very large amount of training images.

Alternatively or additionally, on the basis of the assignment of image features FEA1 to object sub-types OST, statistical correlations between the image features FEA1 and the object sub-types OST can be determined and specified or represented by object-specific correlation parameters CP1. The probabilistic classifier BMLP1 can be configured on the basis of these correlations or correlation parameters CP1. For this purpose, it is possible to use a multiplicity of known standard methods by which, from the correlations, the conditional probabilities, uncertainties, and/or probabilistic graphs required for the configuration of Bayesian neural networks are determined as configuration parameters.

Furthermore, particularly during the classification of developmental stages of cell types, sequence information about a necessary or probable sequence of the developmental stages can be evaluated by the probabilistic classifier BMLP1 as additional information or a constraint during the sub-type recognition. Preferably, on the basis of the sequence information, a so-called ordinal regression is carried out during the configuration of the probabilistic classifier BMLP1.

Furthermore, a so-called a priori distribution AD for the correlation parameters CP1 of the probabilistic classifier BMLP1 can be derived from the learning parameters of the second neural network module MLP that are set by the training, that is to say here from the optimized weights of neural connections and/or from the statistical distribution thereof. In this way, it is possible to use the learning parameters and other training parameters of the second neural network module MLP—as indicated by dashed arrows in FIG. 1—as hyperparameters HP for the configuration of the probabilistic classifier BMLP1.

The procedure described above specifically for the object type OT1 is carried out analogously for the object type OT2 and optionally for further object types in order to configure one or more further object-type-specific sub-type recognition modules BMLP2, . . . of the image evaluation device BA for recognizing object sub-types within the relevant object type.

Images newly recorded and/or not yet classified are then intended to be evaluated by means of the image evaluation device BA trained and configured as described above.

Figure 2:
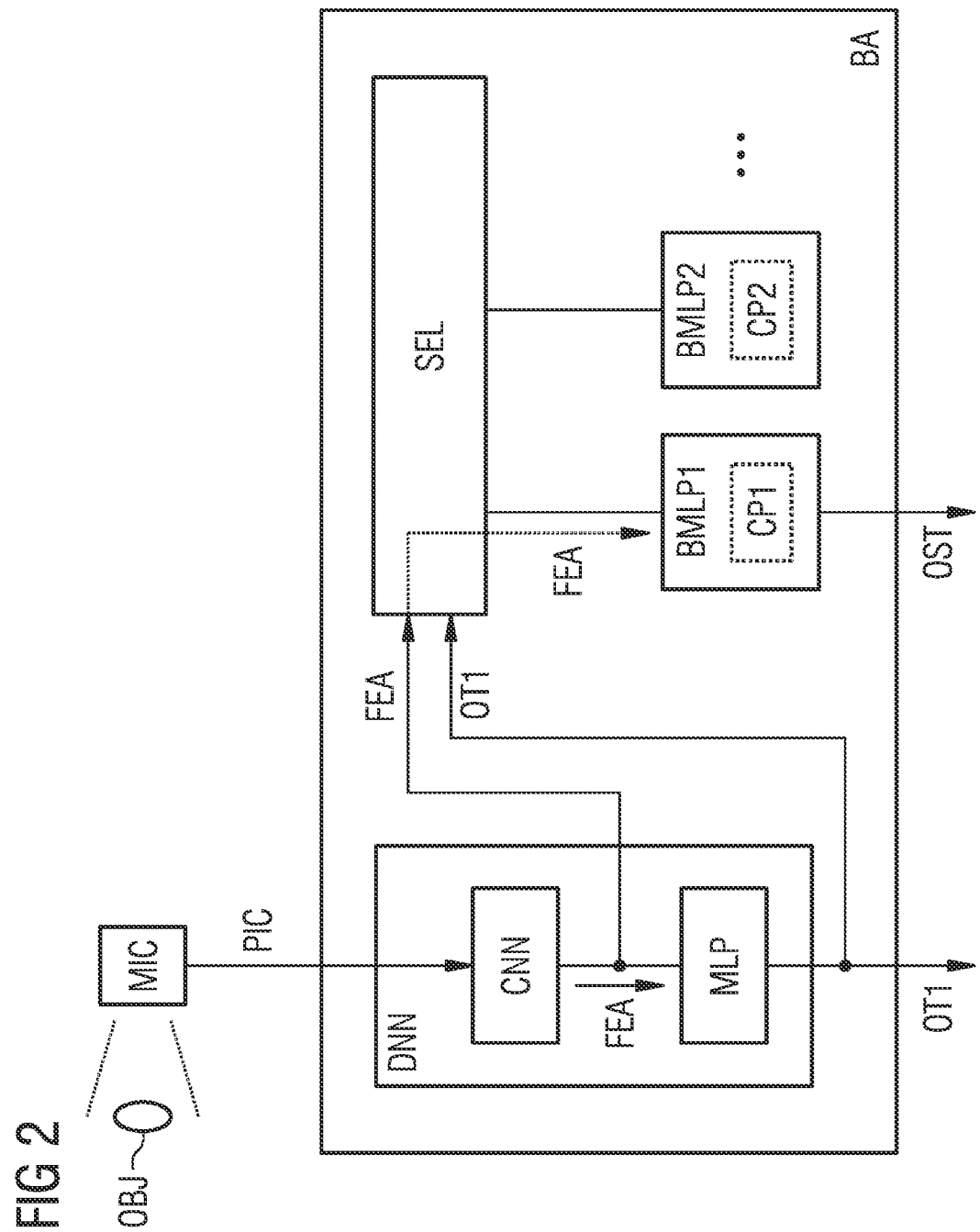
FIG. 2 illustrates an evaluation of images by means of the configured image evaluation device.

FIG. 2 illustrates such an evaluation of an image PIC of an object OBJ by means of the trained and configured image evaluation device BA. Insofar as the same reference signs as in FIG. 1 are used in FIG. 2, the same entities are designated.

In the present exemplary embodiment, the recorded object OBJ is a biological cell, the cell type of which is intended to be recognized as an object type and the developmental stage of which is intended to be recognized as an object sub-type by the configured image evaluation device BA. The image PIC to be evaluated is recorded by means of a microscope MIC provided with a camera.

The recorded image PIC is read in by the image evaluation device BA and fed into the trained first neural network module CNN. The trained first neural network module CNN generates an output data set FEA from the image PIC, the output data set comprising, in accordance with the training objective described above, preferably those image features which are particularly well suited to object type recognition. The output data set FEA generated by the trained first neural network module CNN is fed into the trained second neural network module MLP by the trained first neural network module CNN. From the output data set FEA of the first neural network module CNN, the trained second neural network module MLP derives an output data set which, in accordance with the above training objective, is intended to specify an object type of the recorded object OBJ as correctly as possible. In the present exemplary embodiment, it shall be assumed that the output data set of the trained second neural network module MLP specifies the object type OT1 for the object OBJ.

The image features FEA generated by the trained first neural network module CNN and also the determined object type OT1 are communicated to a selection module SEL of the image evaluation device BA. The selection module SEL is coupled to the probabilistic classifiers BMLP1, BMLP2, ..., which are respectively configured in an object-type-specific manner, and serves for selecting one of the probabilistic classifiers BMLP1, BMLP2, ..., depending on the object type respectively derived. In the present exemplary embodiment, OT1 was determined as object type, on account of which the probabilistic classifier BMLP1 specific to the object type OT1 is selected by the selection model SEL.

Furthermore, the image features FEA are communicated from the selection model SEL—as indicated by a dotted arrow in FIG. 2—specifically to the selected probabilistic classifier BMLP1. The selected classifier BMLP1 correlates the image features FEA on the basis of its correlation parameters CP1 and/or by comparison with stored training output data sets or image features of the first neural network module CNN. In this case, preferably, that object sub-type is determined which, in accordance with the correlation parameters CP1, correlates the best with the image features FEA, that is to say has a largest or sufficiently large correlation. Alternatively or additionally, it is possible to ascertain a distance between the image features FEA and stored training output data sets or image features of the first neural network module CNN. In this case, that object sub-type can be determined whose assigned training output data set has a smallest or sufficiently small distance. An object sub-type determined in the ways above can be regarded as a most probable object sub-type OST of the object OBJ.

The object type OT1 determined by the trained second neural network module MLP and the object sub-type OST determined here by the classifier BMLP1 are finally output as the classification result for the object OBJ by the image evaluation device BA.

As a result of the classification task being divided into a data-driven object type recognition (often also referred to as a big data approach) and a probabilistic object sub-type recognition suitable even for a small amount of training data (small data), a recognition certainty can often be significantly improved. This applies in particular to the recognition of object sub-types of rare object types.

Besides the above-described application in medical diagnosis, the configuration method and/or image evaluation method according to the invention can be used in many further technical fields for efficiently classifying imaged objects. Thus, for example, for optically monitoring technical or non-technical systems, such as, for example, production installations or agriculturally productive land, for an optical sensor apparatus of autonomous systems, or else for general optical classification tasks.

The invention claimed is:

1. A method for configuring an image evaluation device for determining an object type and an object sub-type of an imaged object, comprising:
    inputting a multiplicity of training images respectively assigned to an object type and an object sub-type into a first neural network module for recognizing image features,
    inputting training output data sets of the first neural network module into a second neural network module for recognizing object types based on recognized image features, wherein:
    the first and second neural network modules are jointly trained such that training output data sets of the second neural network module at least approximately reproduce the object types assigned to the training images, and
    for a respective object type:
        inputting training images assigned to the respective object type into a trained first neural network module, the trained first neural network module only receiving training images for a respective object type,
        generating a training output data set of the trained first neural network module for a respective training image of the respective object type,
        assigning the object sub-type of the respective training image to the training output data set of the trained first neural network module, and
        inputting the training output data set of the trained first neural network module into a dedicated sub-type recognition module for only the respective object type for recognizing object sub-types of the respective object type on the basis of image features recognized by the trained first neural network module.

2. The method as claimed in claim 1, wherein:
    the sub-type assignments are used as a basis to derive correlation parameters for a correlation between image features and object sub-types, and
    the sub-type recognition module is configured on the basis of the correlation parameters.

3. The method as claimed in claim 1, further comprising:
    using a probabilistic classifier as the sub-type recognition module.

4. The method as claimed in claim 1, wherein the sub-type recognition module has a linkage structure corresponding to the second neural network module.

5. The method as claimed in claim 1, wherein:
    object sub-types to be recognized for an object type form an ordered sequence specified by predefined sequence information, and
    the sub-type recognition module is configured on the basis of the predefined sequence information.

6. The method as claimed in claim 5, wherein:
    during configuration of the sub-type recognition module, an ordinal regression is carried out on the basis of the predefined sequence information.

7. The method as claimed in claim 3, wherein:
    an a priori distribution of configuration parameters of the probabilistic classifier is determined on the basis of learning parameters of the trained second neural network module.

8. The method as claimed in claim 1, wherein:
    configuration parameters of the sub-type recognition module are set depending on training parameters of the first or second neural network module.

9. An image evaluation method for determining an object type and an object sub-type of an imaged object, comprising:
    inputting an image to be evaluated into the first neural network module as trained in claim 1,
    inputting a resulting output data set of the first neural network module into the second neural network module as trained in claim 1,
    deriving an object type from a resulting output data set of the second neural network module,
    selecting a sub-type recognition module specific to only the derived object type,
    determining an object sub-type correlating with the output data set of the first neural network module by the selected sub-type recognition module, and
    outputting the derived object type and the determined object sub-type.

10. The image evaluation method as claimed in claim 9, wherein:

the determining the object sub-type correlating with the output data set includes determining a respective distance between the output data set of the first neural network module and a plurality of stored training output data sets of the first neural network module, the method further comprising:

selecting a training output data set having a smaller distance than another training output data set, and determining an object sub-type assigned to the selected training output data set as the object sub-type correlating with the output data set.

11. The method as claimed in claim 9, wherein:
the first neural network module, the second neural network module, or the sub-type recognition module comprises an artificial neural network, a recurrent neural network, a convolutional neural network, a multilayer perceptron, a Bayesian neural network, an autoencoder, a deep learning architecture, a support vector machine, a data-driven trainable regression model, a k-nearest neighbor classifier, a physical model, or a decision tree.

12. The method as claimed in claim 1, wherein:
the first neural network module, the second neural network module, or the sub-type recognition module comprises an artificial neural network, a recurrent neural network, a convolutional neural network, a multilayer perceptron, a Bayesian neural network, an autoencoder, a deep learning architecture, a support vector machine, a data-driven trainable regression model, a k-nearest neighbor classifier, a physical model, or a decision tree.

\* \* \* \* \*